Patented Feb. 5, 1935

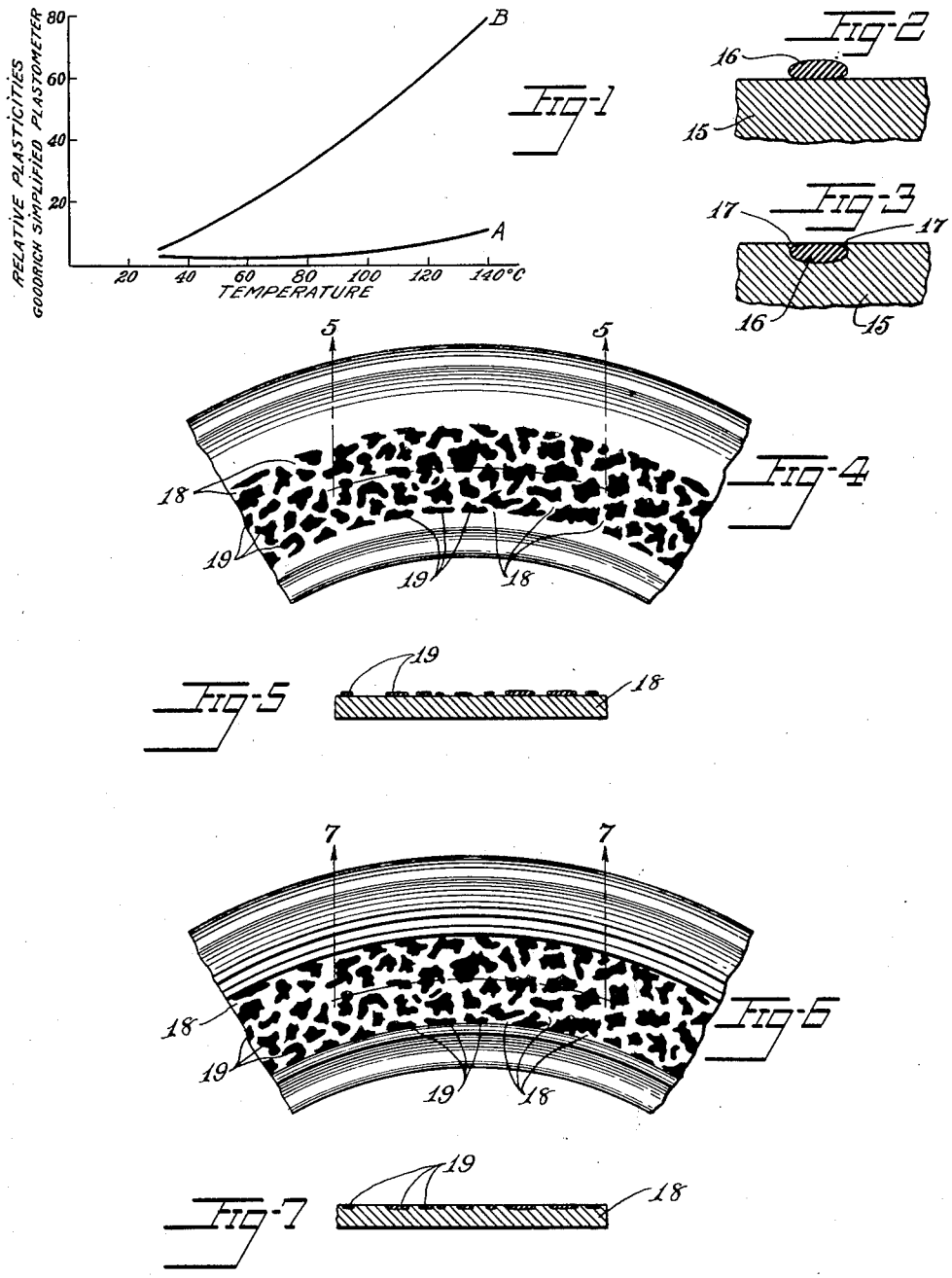

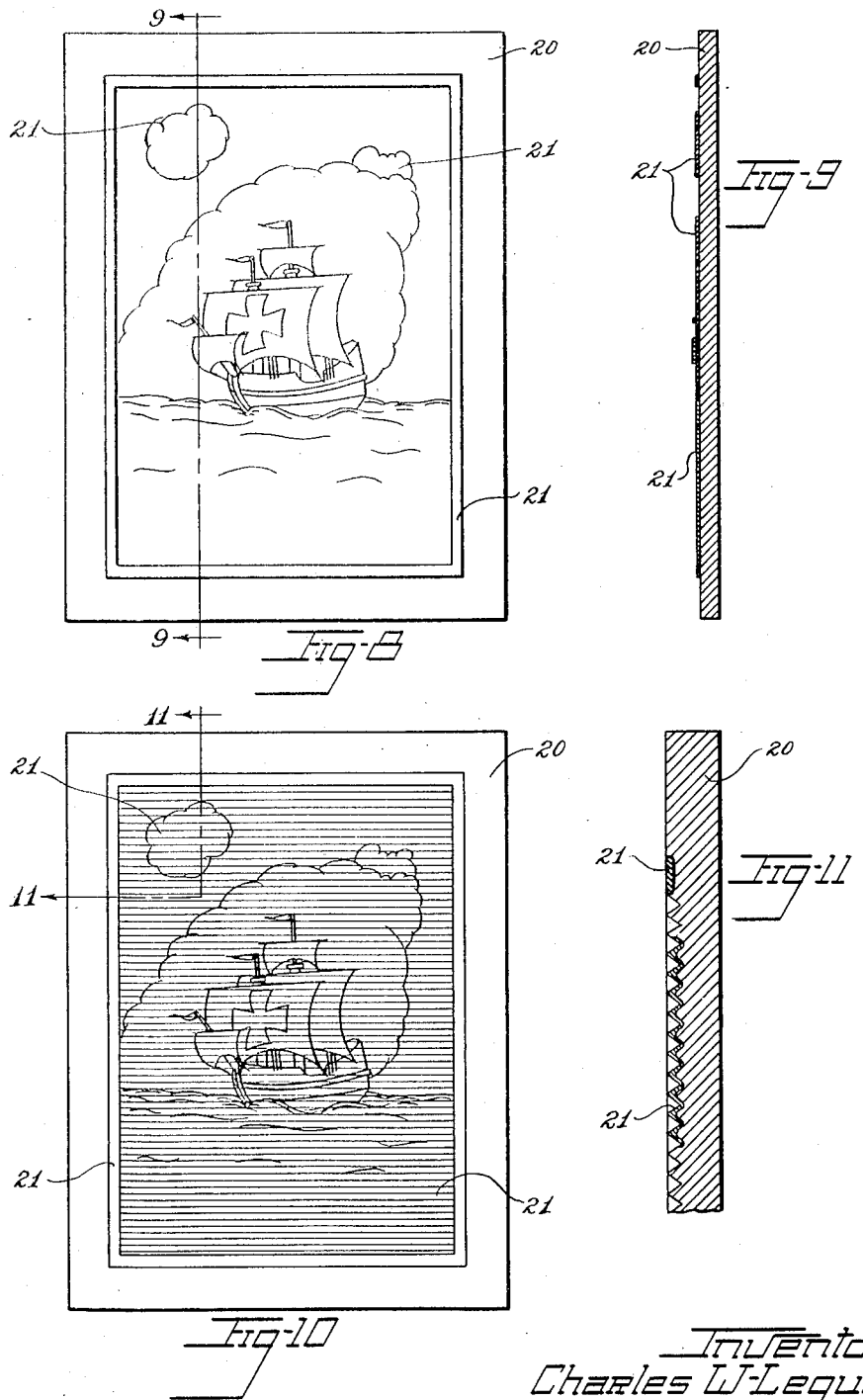

1,989,703

UNITED STATES PATENT OFFICE 1,989,703

DECORATED RUBBER ARTICLE AND METHOD OF MAKING SAME

Charles W. Leguillon, Akron, Ohio, assignor to The B. F. Goodrich Company, New York, N. Y., a corporation of New York Application December 21, 1931, Serial No. 582,233

21 Claims. (Cl. 18—61)

This invention relates to the art of rubber manufacture, and particularly to the manufacture of multi-color decorated rubber articles.

An object of this invention is the manufacture, by a simple, economical process, of rubber articles in a plurality of colors including blended and shaded color effects and possessing a new type of beauty hitherto unknown to the art. Another object of this invention is the production of rubber articles having decorations not easily marred or destroyed by abrasive wear such as scuffing or rubbing. A further object of the invention is the manufacture of rubber articles, interspersed portions of the surface of which have coefficients of friction different from the remainder of the surface, in such manner as to break up the continuity of the frictional characteristics of the surface of the articles.

The prior art discloses a number of methods for manufacturing rubber goods decorated in color, but for certain purposes, these prior methods are unsatisfactory, either because the color effects which may be achieved are limited, or because the decorations are readily defaced by chipping, peeling or wearing away, particularly in severe or abrasive service.

The present invention in a preferred embodiment comprises forming the body of the article to be manufactured of a rubber stock having a relatively high temperature coefficient of plasticity such as an unvulcanized, masticated, or mill-mixed and softened rubber stock of any suitable composition, and applying thereto by any convenient means, and in any desired configuration, a special surface decorating rubber stock in liquid form which has upon solidification a relatively low temperature coefficient of plasticity, such for example as an unmasticated rubber latex of suitable composition, drying the surface decorative stock and vulcanizing the article in a mold under pressure. The surface decorating rubber stock should have in its liquid condition a specific wetting action for the body stock and for any loose surface particles thereon and also possess a relatively high surface tension so that each detached portion will assume when in contact with the surface of the body stock a rounded edge configuration, which solidifies upon drying in this shape and upon subsequent vulcanization in a mold under pressure is embedded in the body stock with an undercut interface at such rounded edges. Further, the elevated temperatures to which the stocks are heated during vulcanization cause the more heat-plastic body stock to flow around the less heat-plastic and less easily flowing decorating stock, in effect imbedding the decorating stock at the surface of the body stock in the original desired configuration, flush with the surface of the article, and following its contours without becoming distorted in any substantial respect.

It is of considerable importance to the satisfactory operation of this invention that the decorative latex rubber stock be applied to the body stock in a liquid condition for the reasons already above indicated. The liquid latex stock will wet the surface of the body stock and occlude any fine particles thereon which might otherwise prevent a close interfacial bond between the two stocks upon vulcanization. Further, the latex stock when applied to the body stock in liquid form and permitted to dry thereon, dries rapidly at the exposed surface of the latex stock but only slowly at the interface so that no skin-hardening of the latex at the interface occurs but rather a blending or interface locking of the latex stock with the body stock takes place, which on vulcanization produces a strong interlock or bond that is not obtained where a preformed latex stock is cured in contact with a masticated rubber stock.

It will thus be apparent that the strong interfacial bond of the two stocks throughout the extent of their contact, together with the mechanical undercut or wedging jointure of the stocks at their edges, combine to produce a union between the stocks which approaches in strength that of the vulcanized rubber stocks and absolutely prevents separation of these stocks even under most severe service conditions.

The invention may be more clearly understood by referring to the accompanying drawings in which Fig. 1 is a graph showing the relation between the relative plasticities over a range of temperatures of two rubber stocks of types suitable for use in this invention.

Fig. 2 is an enlarged fragmentary section of an article in the process of making, the decorative latex stock having been applied as a liquid and allowed to solidify on the body stock.

Fig. 3 is a sectional view similar to that of Fig. 2, the article having been vulcanized in a mold under elevated temperature and pressure, Fig. 4 is a fragmentary plan view of an article such as the side-wall of an unvulcanized automobile tire, illustrating a preliminary stage of construction, Fig. 5 is a vertical section on line 5—5 of Fig. 4, Fig. 6 is a plan view of the article of Fig. 4 after the article has been vulcanized in a mold under pressure, Fig. 7 is a vertical section on line 7—7 of Fig. 6, Fig. 8 is a plan view of another modification of my invention showing an article, such as a mat, in a preliminary stage of construction, Fig. 9 is a vertical section on line 9—9 of Fig. 8, Fig. 10 is a plan view of the article of Fig. 8 after vulcanization in a mold under pressure, and Fig. 11 is an enlarged vertical section on line 11—11 of Fig. 10.

Referring to Figs. 1 to 3 of the accompanying drawings, a rubber stock such as one obtained from the solidification of rubber latex and suitable for use as the decorative stock of my invention in its wetting and surface tension properties, is indicated by the curve A on the graph of Fig. 1, which shows that such a stock has a relatively low plasticity at room temperature, and upon its temperature being raised from 30° to 140° C., does not rapidly become more plastic as it is heated to these higher temperatures.

As a typical example of such a latex stock which may be used as the decorating stock of this invention, the following composition is given in dry weight of solids containing in the liquid latex as applied to the body stock, the liquid latex also containing ammonia, or other alkali or preservative.

| | |
|---|---|
| Rubber | 100.0 |
| Zinc oxide | 3.0 |
| Sulfur | 2.5 |
| Accelerator | 0.3 |
| Pigment | 5.0 |
| Color | 20.0 |
| Wax | 2.0 |
| Hydrophillic colloid | 5.0 |

A masticated, mill-mixed and softened stock, suitable for use as the body stock hereinbefore referred to, on the contrary, is more plastic than a latex stock at room temperature, and softens rapidly as the temperature of the stock is raised as indicated in curve B showing the effect upon the plasticity of such a stock of heating from 30° C. to 140° C.

As an example of a mill-mixed stock suitable for use as the body stock the following composition is given:

| | |
|---|---|
| Rubber (smoked sheets) | 44.27 |
| Gas black | 0.13 |
| Accelerator | 0.60 |
| Sulfur | 1.35 |
| Pigment | 43.15 |
| Zinc oxide | 10.00 |
| Wax | 0.50 |

Because of the marked difference in the plasticities which is a measure of the flow characteristics of the two stocks, it is readily appreciated that when an article composed of two unvulcanized stocks, having differential temperature coefficients of plasticity such as these, are concurrently heated in contact with each other in a mold under pressure, the body, or mill-masticated stock will readily soften and flow around the stiffer or decorating stock which will retain substantially its original configuration and relative position, and in the vulcanized state will be imbedded in, and integral with, the surface of the body stock as hereinbefore described.

Thus, in Fig. 2, the body 15 of an article in the process of manufacture, composed of masticated rubber such as that above described, has disposed on its surface a decorating stock 16 in the form of compounded liquid latex. The latex because of surface tension assumed a globular configuration at its margin, and subsequently dries and solidifies in that shape, thus forming a deposit 16 having an oblate spheroidal section of unmasticated latex rubber composition on the surface of the masticated rubber body stock 15.

The article is then placed in a suitable mold and vulcanized under heat and pressure. During vulcanization, the more heat-plastic body stock 15 softens relatively rapidly and flows around the less-heat plastic and less rapidly softening latex stock 16. Because of its relatively low temperature coefficient of plasticity, the latex stock 16 does not soften sufficiently during vulcanization, to become deformed in any substantial respect and therefore, maintains essentially its original configuration and relative projected position with respect to the body stock so that after vulcanization is completed and the article removed from the mold, (Fig. 3) the decorating stock 16 is found firmly anchored in the body 15 by the overhanging projections 17, formed during vulcanization by flow of the body stock 15 around and over the rounded margin of the non-flowing latex stock 16, and in the same general shape and relative position as before vulcanization.

The invention is capable of numerous applications in the manufacture of decorated rubber articles. In the embodiment of the invention illustrated in Figs. 4 to 7, there is shown a body stock 18 of unvulcanized mill-masticated rubber, which may be the sidewall of a tire casing and may be either a white, a black, or a colored stock, to which has been applied in any suitable manner, a latex rubber decorating stock 19 of any desired composition and preferably of a color contrasting to, and harmonizing with, the color of the body stock 18. Since it is desirable to apply the decorating latex stock 19 as a liquid such as an aqueous dispersion, it may be conveniently sprayed, or otherwise applied, onto the surface of the body stock 18, and allowed to dry, leaving the solid colored decorating stock 19 on the surface of the body stock 18 in some configuration such as that illustrated in Fig. 4. The article, if it is a tire casing, is then placed in a mold and vulcanized in the usual manner, so as to cause the softer and more plastic body stock 18 to flow around the less plastic decorating stock 19, so that in the vulcanized state, after removal from the mold, (Figs. 6 and 7) the decorating stock 19 is imbedded in, and integral with, the body stock 18 in substantially the same configuration it had before being placed in the mold.

A valuable result is obtained, when the high heat-plastic body stock is of such a composition that, when vulcanized, an article of the grade commonly known as hard rubber is produced. When such an article, which may be an automobile steering wheel, is removed from the mold and polished, the inlaid decorating stock, in contrast to the polished hard rubber body surface, not only presents an appearance that is extremely pleasing to the eye, but also results in a surface, isolated portions of which have different coefficients of friction, thus breaking up the continuity of the frictional characteristics of the surface of the article and aiding materially, if the article is an automobile steering wheel, in preventing slippage of the driver's hands over the surface of the wheel.

Figs. 8 to 11, inclusive, illustrate the application of this invention to an article having, in the vulcanized state, an uneven surface, such as a corrugated mat. A slab of unvulcanized body stock 20, is prepared, sheeted, and cut to size in any suitable manner, and a latex rubber decorating stock 21 is applied thereto in liquid form in any suitable manner such as has been hereinbefore described. The decorating stock 21 may be composed of a number of different colored deposits of latex rubber composition, obtained by the dessication of colored latices applied to the body stock 20 in the liquid state, the various colors of latex rubber being blended and relatively disposed in such a manner as to produce an artistic scene as illustrated in Fig. 8. The mat is then placed in a mold having a corrugated molding face and vulcanized under pressure in the usual manner. After vulcanizing and removing the articles from the mold, the decorating stock 21 (Figs. 10 and 11) is found imbedded in, and integral with, the body 20, the two combining to form a unitary surface following the contours of the article without having disturbed the configuration of the design as it appears to the eye in any substantial respect.

The accuracy of outline and detail of design are preserved equally well when articles decorated by this method are molded in more complicated surface configurations.

The advantages which are to be gained through the practice of this invention are immediately apparent to one skilled in the art. The process is inexpensive and its simplicity permits of wide application. Any molded rubber article may be decorated with equal facility.

Mottled color effects similar to that illustrated in Fig. 6 possess a striking beauty and a lively scintillating appearance that have not heretofore been produced in rubber goods. Durable decorative scenes comprising shaded and blended color effects, multi-color trade-marks and like designs are readily executed on almost any article of rubber.

The design is not readily destroyed by abrasive surface wear, because the latex decorative layer may be built up to any desired thickness in the preliminary stages of construction, so that in the finished article, the imbedded decorative stock will have substantial depth. Likewise, the decorations are not damaged by flexing the article, or other rough handling because the decorating stock, after vulcanization, is integral with and anchored to the body stock.

Further, in a decorated corrugated mat similar to that illustrated in Fig. 10, the design will not be defaced by intensive surface wear, for a considerable thickness of rubber decorating stock on the tip of the peaks of the corrugations must be worn through before any damage whatever is done to the design, and even though the peaks of the corrugations should be worn away to an appreciable extent, the greater part of the design remains in the valleys where it is protected by the raised peaks, and a considerable portion of the peaks may be worn away without destroying the integrity of the general design.

Another advantage is that the decorating stock, applied as liquid latex, flows around and includes any particles of material present on the body surface, and seeps into the pores and irregularities of the base surface so that after subsequent coagulation and vulcanization the two stocks are firmly held together by an interlocking microscopic rubber network, including in the rubber any foreign material which would ordinarily act as a separator, thus completely eliminating stratification at the union between the two stocks.

It is apparent that this invention may be applied, either substantially as hereinbefore described, or in a modified form, in the decorating of numerous rubber articles other than those mentioned, such as hot water bottles, bath caps and shoes, toys, hard rubber table and desk tops, and wearing apparel and other articles.

It is obvious that this invention is susceptible of numerous other modifications, and that many changes may be made in the process and products hereinbefore described all within the spirit and scope of this invention. It is to be understood, therefore, that the invention is not to be limited except as may be required by the prior art, and as indicated in the appended claims.

I claim:

1. A molded vulcanized rubber article comprising two distinct types of rubber stock including a body stock and a surface decorating stock, the decorating stock being applied to the body stock as a liquid dispersion and dried thereon prior to vulcanization, said decorating stock in its dried unvulcanized condition having a lower plasticity than does the unvulcanized body stock at all temperatures to which the stocks are subjected during vulcanization.

2. A molded vulcanized rubber article comprising two distinct types of rubber stock including a body stock and a surface decorating stock, the decorating stock being applied to the body stock as a liquid dispersion containing uncoagulated rubber latex, and dried thereon prior to vulcanization, said decorating stock in its dried unvulcanized condition having a lower plasticity than does the unvulcanized stock at all temperatures to which the stocks are subjected during vulcanization.

3. A vulcanized rubber article comprising two distinct types of rubber stock including a body stock and a surface decorating stock distributed over said body stock in such discontinuity as to leave a multiplicity of areas of said body stock exposed within the region to which the decorating stock is applied, the body stock consisting of masticated and softened rubber composition, and the surface decorating stock consisting of unmasticated latex rubber composition, said decorating stock in its unvulcanized condition having a lower plasticity than does the unvulcanized body stock at all temperatures to which the stocks are subjected during vulcanization, and being imbedded in and interlocked with the body stock.

4. A molded vulcanized rubber article comprising two distinct types of rubber stock including a body stock and a surface decorating stock, the body stock consisting of masticated and softened rubber composition, and the surface decorating stock consisting of unmasticated latex rubber composition, said decorating stock being inlaid in the body stock without distortion of its configuration.

5. A vulcanized rubber article having a corrugated surface ornamented with a decorating stock containing unmasticated latex rubber, the decorating stock being applied to the body stock as an aqueous dispersion and dried thereon prior to vulcanization, said decorating stock being inlaid in the body stock after vulcanization in a mold under pressure without substantial distortion of its configuration.

6. A process of making a decorative rubber article which comprises preparing two distinct types of plastic, unvulcanized rubber stocks, including a body stock and a surface decorating stock, said decorating stock in its unvulcanized condition having a lower plasticity than does the unvulcanized body stock at all temperatures to which the stocks are subjected during vulcanization, roughly forming the body stock to the shape and size of the article, applying the surface decorating stock in liquid form to the roughly formed body stock in a decorative design, drying the deposit, and vulcanizing the assembled stocks in a mold under pressure.

7. A process of making a decorative rubber article which comprises preparing two distinct types of plastic, unvulcanized rubber stocks, including a body stock and a surface decorating stock, said decorating stock in its unvulcanized condition having a lower plasticity than does the unvulcanized body stock at all temperatures to which the stocks are subjected during vulcanization, roughly forming the body stock to the shape and size of the article, applying the surface decorating stock as an aqueous liquid dispersion to the roughly formed body stock in a decorative design, drying the deposit, and vulcanizing the assembled stocks in a mold under pressure.

8. A method of making a decorated rubber article which comprises forming or building up the unvulcanized article, then painting with colored latices on the surface thereof a decorative design, drying said latices, and subsequently vulcanizing the article in a mold under pressure.

9. A method of making a decorated rubber article which comprises fabricating the unvulcanized article in any desired manner, applying to the surface thereof a multitude of localized deposits of a liquid rubber dispersion, then drying said deposits, and vulcanizing the article in a mold under pressure so as to cause the said deposits to become imbedded in the surface of and firmly anchored to the body of the finished article.

10. A vulcanized rubber article comprising a body stock and a multitude of relatively small discrete decorating masses comprising unmasticated latex rubber of varying sizes and shapes disposed in chance arrangement and imbedded in the surface of and firmly anchored to the body stock.

11. A resilient tire comprising a tread, and a sidewall decorated with a multitude of colored unmasticated latex rubber masses of irregular sizes and shapes disposed in chance arrangement and imbedded in and firmly bonded to the sidewall body.

12. A rubber article comprisng a body stock of masticated rubber composition and a surface decorating stock comprising unmasticated latex rubber disposed in a pictorial design.

13. A rubber article comprising a body portion of hard vulcanized rubber having imbedded in its surface masses of soft vulcanized unmasticated latex rubber.

14. A vulcanized rubber article comprising two distinct types of rubber stocks including a body stock consisting of masticated rubber, and imbedded in and flush with the surface thereof a decorating stock consisting of unmasticated rubber derived from liquid rubber latex dried from the liquid state while in contact with the unvulcanized body stock, said surface decorating stock being so distributed over the surface of the body stock as to leave portions of the body stock exposed within the region to which the surface decorating stock is applied.

15. A vulcanized rubber article having a varicolored unitary surface presenting molded irregularities, said surface comprising exposed areas of a masticated rubber body stock of one color and of an unmasticated latex rubber decorating stock of different color, said decorating stock being imbedded in the surface of the body stock flush with the irregular molded surface thereof without substantial distortion of its decorative configuration.

16. A vulcanized rubber article having a varicolored unitary surface presenting a series of molded projecting ribs, said surface comprising exposed areas of a masticated rubber body stock of one color and of an unmasticated latex rubber decorating stock of different color, said decorating stock being imbedded in the surface of the body stock flush with the molded surface thereof without substantial distortion of its decorative configuration.

17. A vulcanized rubber article having a unitary surface presenting molded irregularities, said article comprising a masticated rubber body stock and a surface decorating stock comprising unmasticated latex rubber disposed in a pictorial design imbedded in the molded irregular surface of the body stock without substantial distortion of its pictorial configuration.

18. A vulcanized rubber article having a unitary surface comprising interspersed exposed areas of a body stock consisting of masticated rubber and of a flush imbedded surface stock consisting of unmasticated latex rubber, one of said stocks being vulcanized to a harder state than the other to provide interspersed surface areas having a coefficient of friction differing substantially from that of the exposed areas of the other stock.

19. The method which comprises spraying directly onto the surface of an unvulcanized masticated rubber product a liquid dispersion of rubber in a quantity insufficient completely to cover said surface, drying the dispersion, and vulcanizing the rubber in a mold under pressure.

20. The method which comprises spraying directly onto the surface of an unvulcanized masticated rubber product liquid rubber latex in a quantity insufficient completely to cover said surface, drying the latex, and vulcanizing the rubber in a mold under presure.

21. A vulcanized rubber article made substantially of masticated rubber having unmasticated latex rubber covering a portion only of its surface in a predetermined design flush with the remainder of the surface.

CHARLES W. LEGUILLON.

CERTIFICATE OF CORRECTION.

Patent No. 1,989,703.  
February 5, 1935.

CHARLES W. LEGUILLON.

It is hereby certified that error appears in the printed specification of the above numbered patent requiring correction as follows: Page 2, first column, line 30, for "containing" read contained; page 3, second column, line 37, claim 2, before "stock" insert the word body; and page 4, second column, line 58, claim 20, for "presure" read pressure; and that the said Letters Patent should be read with these corrections therein that the same may conform to the record of the case in the Patent Office.

Signed and sealed this 16th day of July, A. D. 1935.

Leslie Frazer (Seal)

Acting Commissioner of Patents.